(12) United States Patent
Wickert

(10) Patent No.: US 7,452,724 B2
(45) Date of Patent: Nov. 18, 2008

(54) METHOD FOR OPERATING A METERING UNIT OF A CATALYTIC CONVERTER

(75) Inventor: Stefan Wickert, Albershausen (DE)

(73) Assignee: Robert Bosch GmbH, Stuttgart (DE)

( * ) Notice: Subject to any disclaimer, the term of this patent is extended or adjusted under 35 U.S.C. 154(b) by 698 days.

(21) Appl. No.: 10/761,514

(22) Filed: Jan. 20, 2004

(65) Prior Publication Data

US 2004/0203162 A1    Oct. 14, 2004

(30) Foreign Application Priority Data

Jan. 17, 2003    (DE)    ............................. 103 01 602

(51) Int. Cl.
*G01N 33/00*    (2006.01)
(52) U.S. Cl. .................. 436/55; 436/106; 436/116; 436/176
(58) Field of Classification Search .................. 436/55, 436/106, 116, 176; 422/83, 99
See application file for complete search history.

(56) References Cited

FOREIGN PATENT DOCUMENTS

| EP | 0 498 598 | 8/1992 |
|---|---|---|
| EP | 1 024 254 | 8/2000 |
| EP | 0 822 323 | 4/2003 |
| EP | 0708 230 | 7/2003 |

*Primary Examiner*—Sam P Siefke
(74) *Attorney, Agent, or Firm*—Kenyon & Kenyon LLP

(57) ABSTRACT

In order to ensure optimum metering of a reagent to be metered into an exhaust gas during operation of a metering unit of a catalytic converter of a combustion system, in particular an internal combustion engine of a motor vehicle, in any operating state of the catalytic converter and/or in any operating state of the combustion system, a method and a device for operating a metering unit of a catalytic converter of a combustion system provide that, based on a steady-state value of the reagent quantity to be metered during a steady-state operating state of the catalytic converter and/or the combustion system, the quantity of the at least one reagent is determined and adjusted using at least one dynamic correction factor which is dependent on at least one of the performance characteristics of the catalytic converter and at least one of the performance characteristics of the combustion system. The dynamic correction factor and/or a nitrogen oxide correction factor are obtained from a dynamic correction characteristics map or a nitrogen oxide correction characteristics map only as a function of performance characteristics of the internal combustion engine, in particular the engine speed and the injected fuel quantity, and of performance characteristics of the catalytic converter, preferably the nitrogen oxide emission and the temperature of the exhaust gas downstream from the catalytic converter.

15 Claims, 3 Drawing Sheets

METHOD FOR OPERATING A METERING UNIT OF A CATALYTIC CONVERTER

BACKGROUND INFORMATION

To reduce the emission of pollutants, in particular the emission of nitrogen oxides during the operation of combustion systems, exhaust systems of internal combustion engines in motor vehicles are equipped with catalytic converters. Using these, most of the hydrocarbons and carbon monoxide contained in the exhaust gas are burned. However, a large portion of harmful nitrogen oxides, which are discharged into the environment, remains in the exhaust gas when conventional catalytic converters are used.

The nitrogen oxide content in the exhaust gases can also be reduced by using reduction-type catalytic converters. Reduction of nitrogen oxides by adding reduction agents to an exhaust gas flow, also known as selective catalytical reduction (SCR), is known from European Patent Application No. EP 1 024 254.

The reduction agent quantity is determined here based on a load variable, e.g., injected fuel quantity and/or the engine speed, and at least one performance characteristic, e.g., the exhaust gas temperature upstream from the catalytic converter. Moreover, by using at least one characteristics map, the reduction agent quantity is adjusted as a function of at least one additional performance characteristic, e.g., the exhaust gas temperature downstream from the catalytic converter.

For this purpose, a temperature difference is formed between the actual temperature and the setpoint temperature of the exhaust gas downstream from the catalytic converter. Different characteristics maps, in which an adjusted reduction agent quantity is stored as a function of the engine speed and the injected fuel quantity, are provided for different temperature differences.

In order to take into account all occurring temperature differences as completely as possible and to achieve optimum adjustment, as many characteristics maps as possible are used, so that the reduction agent quantity can be accurately determined. Maximum nitrogen oxide conversion and minimum emission of unconverted reduction agent (reduction agent slip) is to be ensured in each operating state of the internal combustion engine and/or the catalytic converter, in particular at different temperatures, different injected fuel quantities, and/or different engine speeds. Prior to the initial startup of the engine and/or the catalytic converter, the characteristics maps must be recorded (calibrated) in advance, by the manufacturer, for example. The more characteristics maps are used, the greater is the metering accuracy during each operating state of the catalytic converter and/or each operating state of the combustion system, but also the greater is the calibration complexity and the more complex is the assignment of the characteristics maps.

SUMMARY OF THE INVENTION

The present invention is based on the technical problem of improving a method and a device for operating a metering unit of a catalytic converter of a combustion system, in particular an SCR catalytic converter of an internal combustion engine in a motor vehicle, e.g., a utility vehicle, in such a way that metering of the quantity of reagent to be metered, in particular of a reduction agent such as a urea/water solution, takes place by requiring little calibration complexity based on as few as possible characteristics maps and still achieving an optimum pollutant reduction and that, in particular, the amount of nitrogen oxides in the exhaust gas is reduced in such a way that specified limiting values are not exceeded.

It is essential, in particular in view of the use of internal combustion engines in motor vehicles in different countries having different emission guidelines, to provide a number of different catalytic converters which meet the particular emission guidelines and which, in case of need, are quickly exchangeable. This requires in particular a marked reduction in the calibration complexity.

In the method according to the present invention, a steady-state value of a reagent quantity to be metered (steady-state reagent value) is determined based on an assumed steady-state operating state of the catalytic converter and/or the combustion system, characterized by the current performance characteristics, independent of the performance characteristics of the catalytic converter, the steady-state value being adjusted using at least one dynamic correction factor (dynamic correction). As a function of at least one of the performance characteristics of the catalytic converter and at least one of the performance characteristics of the combustion system, the dynamic correction factor is obtained from a dynamic correction characteristics map.

In terms of the present invention, steady-state means that constant (steady-state) operating states of the catalytic converter and/or the combustion system over a longer period of time are assumed, e.g., operating states predetermined by the manufacturer. Therefore, steady-state values correspond to values of the particular variables during steady-state operating states, e.g., characterized by a constant nitrogen oxide emission and a constant exhaust gas temperature downstream from the catalytic converter. The steady-state reagent value is dynamically adjusted to changes, in the exhaust gas temperature for example, via the dynamic correction. In other words, the dynamic correction takes into account that, during operation of the combustion system and the catalytic converter, indeed no steady-state but rather dynamic operating states prevail during the actual operating situation.

It is an advantage here that not only operation-relevant parameters of the combustion system and the catalytic converter, the exhaust gas in particular, are used, but also steady-state values, preferably stored in characteristics maps, in which constant (steady-state) operating states of the catalytic converter and/or the combustion system are assumed.

Only one additional characteristics map (exhaust gas temperature characteristics map) for the steady-state value of the exhaust gas (steady-state exhaust gas temperature value), which is separately calibratable for each catalytic converter by the manufacturer, and the determination of the actual exhaust gas temperature downstream from the catalytic converter, with which the steady-state exhaust gas temperature value is adjusted, are necessary. Thus, using only three variables to be measured, namely the exhaust gas temperature value downstream from the catalytic converter, a value for the engine speed, and a value for the injected fuel quantity and only three corresponding characteristics maps, namely the dynamic correction characteristics map, the exhaust gas temperature characteristics map, and a characteristics map for the steady-state reagent value (reagent characteristics map), the necessary reagent quantity is accurately determinable.

In a preferred embodiment of the method, the steady-state reagent value is additionally adjusted using a nitrogen oxide correction factor as a measure for the deviations between a steady-state value for a nitrogen oxide emission (steady-state nitrogen oxide value) from a nitrogen oxide characteristics map and the present nitrogen oxide emission value, preferably by multiplication. The steady-state nitrogen oxide value is stored in the nitrogen oxide characteristics map as a function of the value for the engine speed and the value for the injected fuel quantity. This has the considerable advantage that erroneous metering due to fluctuations in the nitrogen oxide emission, which may take place statically, as well as dynamically, is drastically reduced. Erroneous metering may occur when the determination of the steady-state reagent value was based on a constant, steady-state nitrogen oxide emission. The adjustment to the actual situation in which the nitrogen oxide emission changes dynamically takes place due to the fact that the quantity of the at least one reagent is determined from the steady-state reagent value via correction using the deviation from the actual amount of nitrogen oxide.

It is an additional advantage that only the value of the nitrogen oxide emission is necessary, which is advantageously determined using a nitrogen oxide sensor or via simulation of engine data, measured values, and/or characteristic maps by computing differential equations and/or functionals. The nitrogen oxide emission value is accurately detectable using the nitrogen oxide sensor, whereas the simulation of the nitrogen oxide emission value has the advantage that no nitrogen oxide sensor is necessary, since variables which are detected anyway are used, preferably the values for engine speed and the injected fuel quantity.

A further advantageous embodiment of the method provides the adjustment of the quantity of the at least one reagent using a value of the operating time of the catalytic converter, a value of the operating time of the combustion system, a value of the ambient temperature, a value of the coolant temperature of the combustion system and/or a value of the air moisture, e.g., via multiplication with a corresponding factor. This has the advantage that metering is adjusted to changing environmental influences, whereby the metering accuracy is markedly improved.

In the device according to the present invention at least one means for determining the steady-state reagent value, one correction means for executing the dynamic correction, one dynamic correction characteristics map in which at least one dynamic correction factor is stored, and detection means for detecting at least one of the performance characteristics of the catalytic converter, and at least one of the performance characteristics of the combustion system are provided, with which an adjustment of the steady-state output variables to dynamically changing operating conditions may take place in a simple manner and without great technical complexity.

The difference between the steady-state exhaust gas temperature as a performance characteristic and the exhaust gas temperature downstream from the catalytic converter as another performance characteristic is preferably stored in the dynamic correction characteristics map, making quick access to these performance characteristics possible.

In addition, an advantageous embodiment provides for a control unit having a dynamic correction characteristics map and/or a nitrogen oxide characteristics map. It is an advantage here that, without great technical complexity, the characteristics maps for the dynamic correction are storable in a single control unit, e.g., by programming, and are quickly accessible.

A further advantageous embodiment provides a nitrogen oxide sensor for determining the nitrogen oxide emission value and/or a processor unit for simulating the nitrogen oxide emission value from engine data, measured values and/or characteristics maps via computation, e.g., based upon differential equations and/or functionals. It is possible to determine the nitrogen oxide emission value simply and quickly by using the nitrogen oxide sensor, whereas in the simulation an additional sensor may be omitted altogether.

DETAILED DESCRIPTION

Figure 1:
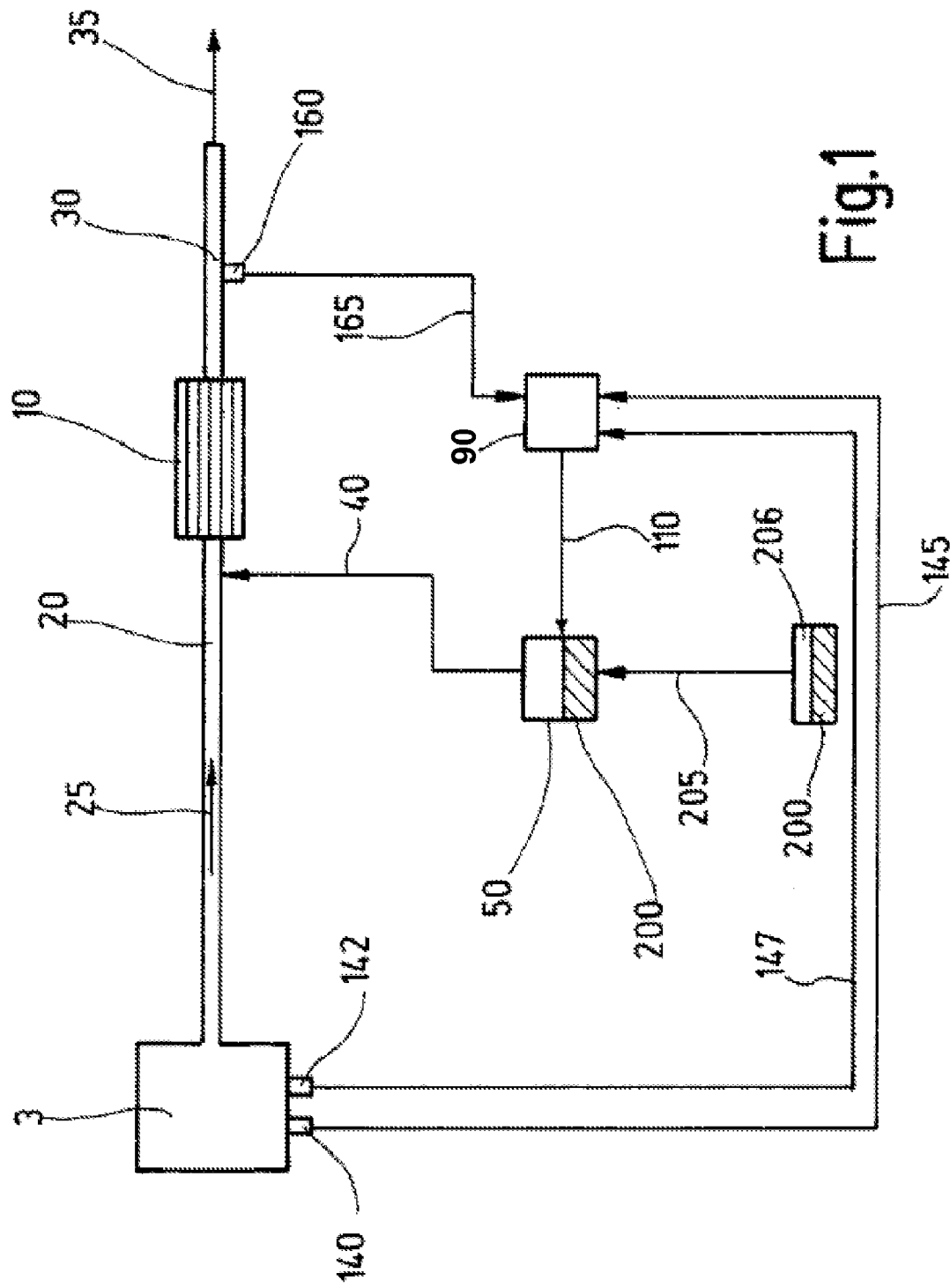
FIG. 1 schematically shows a metering unit of an SCR catalytic converter of an internal combustion engine of a motor vehicle making use of the present invention.

The method and the device according to the present invention are explained below in connection with a metering unit 50, illustrated in FIG. 1, of an SCR catalytic converter 10 of a controlled diesel catalytic converter (cd-modulcat) of an internal combustion engine 3 in the form of a diesel engine of a commercial motor vehicle for metering a urea/water solution (UWS) 200 as a reduction agent into exhaust gases for selective catalytic reduction of nitrogen oxides in particular. However, the method and the device are not limited to metering unit 50 of the SCR catalytic converter 10 or to the use in a utility vehicle or any other motor vehicle having a diesel engine. Instead, they are useable anywhere where exhaust gases of a combustion system, e.g., an oil heating system or a gasoline engine, are to be purified. Instead of the cd-modulcat, any other catalytic converter, of a direct-injection gasoline engine for example, may be provided. In addition, the method and the device are not limited to metering UWS 200, in fact, also other and multiple different liquid and/or gaseous reagents, also as a mixture, may be metered. Instead of being metered into exhaust gases, UWS 200 may also be metered into other liquid and/or gaseous fluids.

SCR catalytic converter 10 is connected to engine 3 via an exhaust pipe 20. During the operation of engine 3, untreated exhaust gas of engine 3 is supplied to SCR catalytic converter 10 in a direction (flow direction) indicated by an arrow 25. The exhaust gas is purified in SCR catalytic converter 10 in a manner known per se. Purified exhaust gas is discharged into the environment downstream from SCR catalytic converter 10 via an exhaust tract 30 (Arrow 35).

Using metering unit 50, UWS 200 is supplied to exhaust pipe 20 via a metering line 40 to reduce the nitrogen oxides contained in the untreated exhaust gas in a manner known per se.

UWS 200 in turn is supplied to metering unit 50 from a container 206 via a UWS feed line 205. In principle, metering unit 50 may also be connected to a different device for supplying UWS 200.

Using a control unit 90, metering unit 50 is controllable via a control line 110. Quantity 400 of UWS 200, determinable as a function of the performance characteristics of SCR catalytic converter 10 and engine 3, is determinable, preferably computable, using control unit 90, as described in connection with FIG. 2.

A value for the exhaust gas temperature $T_{Cat,n}$ of the purified exhaust gas is detectable as a performance characteristic of SCR catalytic converter 10 using a temperature sensor 160 in exhaust tract 30 and is transmittable to control unit 90 via a temperature signal line 165. A value for engine speed n as a first performance characteristic of engine 3 is detectable using an engine speed sensor 140 of engine 3 and is transmittable to control unit 90 via an engine speed signal line 145. Likewise, a value for injected fuel quantity ME as a second performance characteristic of engine 3 is detectable using a fuel measuring device 142 of engine 3 and is transmittable to control unit 90 via an injection signal line 147.

In principle, injected fuel quantity ME may be obtained from a characteristics map in a known manner based on a load signal from an accelerator pedal path, so that fuel measuring device 142 may be omitted.

In principle, other performance characteristics characterizing engine 3 and/or SCR catalytic converter 10, which are detectable using appropriate detecting means, may alternatively or additionally be used.

Figure 2:
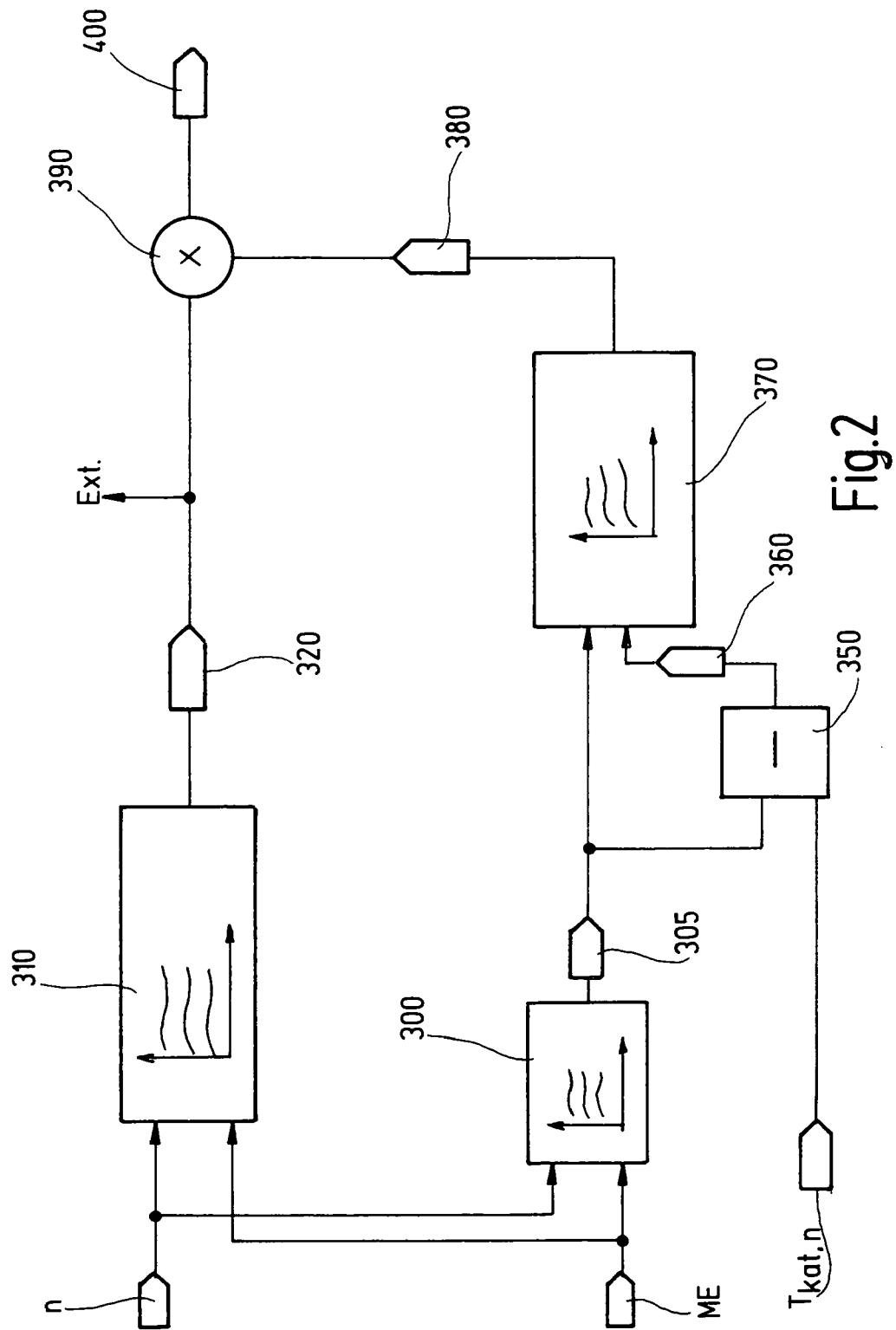
FIG. 2 shows a flow chart of a first exemplary embodiment, making use of the present invention, for determining a urea/water solution quantity from three performance characteristics using one dynamic correction characteristics map.

In a first exemplary embodiment of the method according to the present invention, illustrated in FIG. 2, the detected values for engine speed n and injected fuel quantity ME are transmitted to a first steady-state characteristics map (exhaust gas temperature characteristics map) 300 in which a steady-state value of the exhaust gas temperature downstream from SCR catalytic converter 10 is stored as a function of the values for engine speed n and injected fuel quantity ME.

In terms of the present invention, steady-state means that constant (steady-state) operating states of SCR catalytic converter 10 and engine 3 are assumed, e.g., operating states predetermined by the manufacturer. Therefore, steady-state values correspond to values of the particular variables during steady-state operating states, e.g., characterized by a constant nitrogen oxide emission and a constant exhaust gas temperature downstream from SCR catalytic converter 10.

Steady-state characteristics maps are determined, e.g., by the manufacturer, via measurements on an engine test bench in steady-state operating states of engine 3 and SCR catalytic converter 10.

In addition, a steady-state value for the UWS quantity to be metered (UWS steady-state value 320) is determined from a second steady-state characteristics map (UWS characteristics map 310) as a function of the values for engine speed n and injected fuel quantity ME. Moreover, UWS steady-state value 320 may be picked up at an interface Ext and may, in principle, be transmitted to a processor unit or an output unit (not shown). But interface Ext may also be omitted.

UWS characteristics map 310 is determined, e.g., by the manufacturer, using a variation of UWS metering during steady-state operation of engine 3 and a defined UWS slip. UWS steady-state value 320 corresponds to the UWS quantity to be expected during a steady-state operating state of catalytic converter 10, characterized, for example, by a steady-state exhaust gas temperature.

UWS steady-state value 320 is calibrated during a steady-state operating state at a predetermined, tolerable UWS slip.

A dynamic correction factor 380 is determined from exhaust gas setpoint temperature value 305 and the difference 360 between exhaust gas setpoint temperature value 305 and exhaust gas temperature value $T_{Cat,n}$ from an additional characteristics map (dynamic correction characteristics map 370). Difference 360 is computed using a subtractor 350. Using the dynamic correction value, UWS steady-state value 320 is adapted to the actually prevailing operating states which change dynamically and which are characterized, for example, by changes in the nitrogen oxide emission during the operation of engine 3, in the possible conversion rate of UWS 200 as a function of a catalytic converter temperature and/or in the amount of UWS 200 stored in catalytic converter 10.

Dynamic correction characteristics map 370 is also determined on an engine test bench, e.g., by the manufacturer.

Quantity 400 of UWS 200 is computed by multiplying dynamic correction factor 380 by UWS steady-state value 320 using a multiplier 390 (dynamic correction).

UWS steady-state value 320 is dynamically adapted to changes, in the exhaust gas temperature for example, using the dynamic correction. In other words, the dynamic correction takes into account that, during operation of engine 3 and SCR catalytic converter 10, actually no steady-state but rather dynamic operating states prevail during the actual operating situation.

Figure 3:
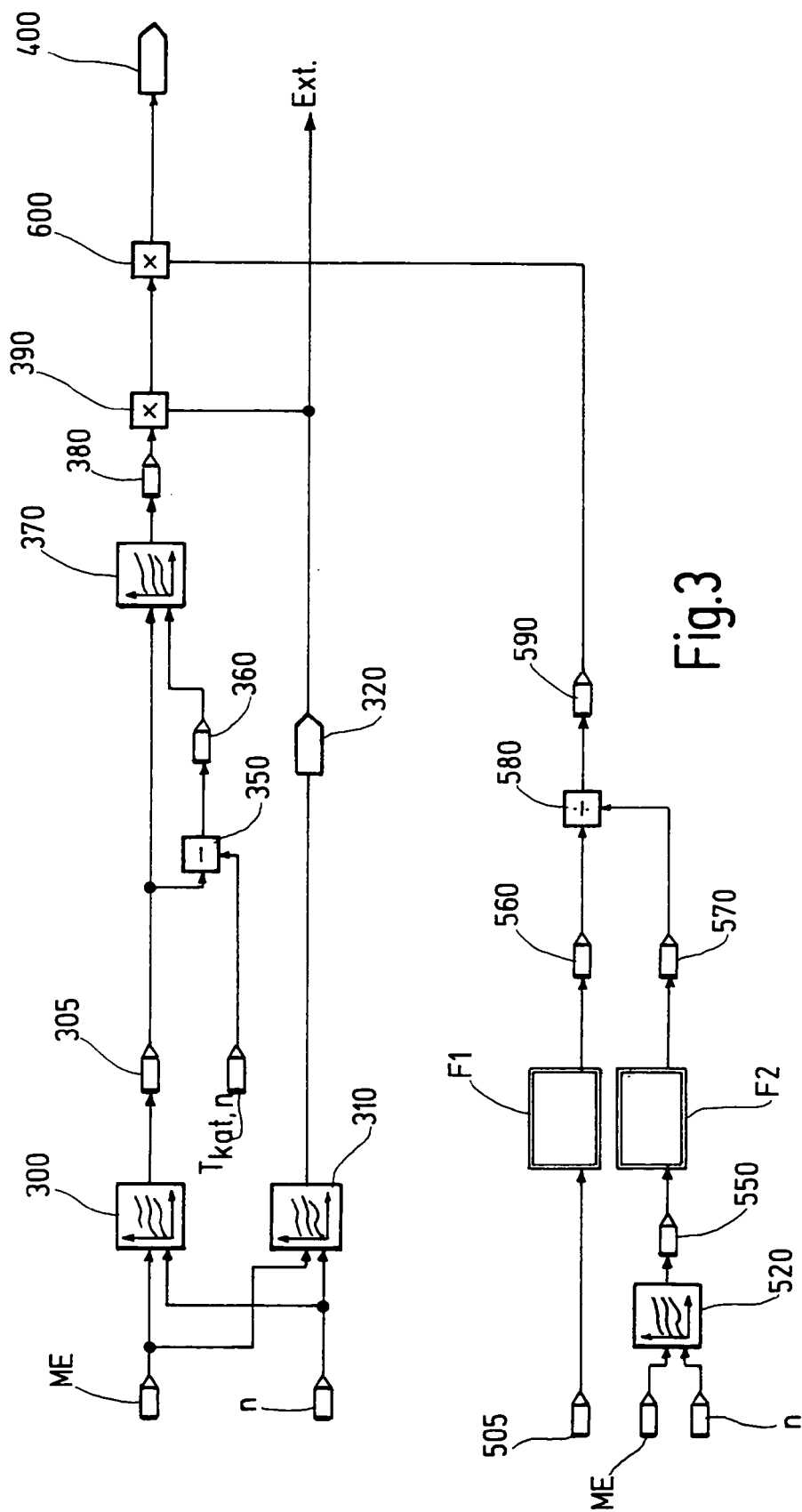
FIG. 3 shows a flow chart of a second exemplary embodiment for determining a urea/water solution quantity from three performance characteristics including a correction using a fourth performance characteristic according to the present invention.

The same reference numbers identify the elements of the second exemplary embodiment of the method according to the present invention illustrated in FIG. 3 which are identical to those of the first exemplary embodiment described in FIG. 2, so that, with regard to their description, full reference is made to the first exemplary embodiment.

This second exemplary embodiment differs from the first exemplary embodiment illustrated in FIG. 2 in that, subsequent to the dynamic correction, quantity 400 of UWS 200 is multiplied by a deviation factor 590 of the nitrogen oxide emission using an additional multiplier 600. Deviation factor 590 is computed by dividing a filtered nitrogen oxide emission value 560 by a likewise filtered steady-state value of the nitrogen oxide emission (filtered steady-state nitrogen oxide value 570) using a quotient generator 580.

Filtered nitrogen oxide emission value 560 is determined from a nitrogen oxide emission value 505 using a first filter F1. In turn, nitrogen oxide emission value 505 is detected upstream from SCR catalytic converter 10 using a nitrogen oxide sensor, for example (not shown).

In principle, instead of using the nitrogen oxide sensor, nitrogen oxide emission value 505 may also be simulated from a model (not shown) via computing differential equations and/or functionals based on engine data, measured values, and/or characteristics maps.

Filtered steady-state nitrogen oxide value 570 is determined from a steady-state value of the nitrogen oxide emission (steady-state nitrogen oxide value 550) via filtering using a second filter F2.

In principle, filter F1 and filter F2 may be dispensed with, which then may result in value fluctuations caused, for example, by electromagnetic interference signals.

Filtered steady-state nitrogen oxide value 570 and steady-state nitrogen oxide value 550 correspond to the nitrogen oxide emission to be expected during a constant (steady-state) operating state of SCR catalytic converter 10, in particular at a constant exhaust gas temperature.

Steady-state nitrogen oxide value 550 is obtained from a fourth steady-state characteristics map (nitrogen oxide characteristics map 520) as a function of the values for injected fuel quantity ME and engine speed n.

Nitrogen oxide characteristics map 520 is determined on an engine test bench during a steady-state operating state of SCR catalytic converter 10, e.g., by the manufacturer.

The four characteristics maps or steady-state characteristics maps 300, 310, 370, and 520, described in connection with FIGS. 2 and 3, may, in principle, be stored in control unit 90 and may, in a manner known per se, be imported or changed via data transmission or software-related programming. They may, however, also be stored at a different location, in an engine control unit, for example.

In principle, the values for engine speed n and/or injected fuel quantity ME may also be transmitted via a bus system, e.g., a controller area network (CAN). Instead of or in addition to the values of engine speed n and injected fuel quantity ME, other performance characteristics of engine 3 may also be used.

As described in connection with FIG. 2, instead of basing dynamic correction factor 380 on exhaust gas temperature value $T_{Cat,n}$ and exhaust gas setpoint temperature value 305, it may also be obtained from dynamic correction characteristics map 370 based on nitrogen oxide emission value 505 and steady-state nitrogen oxide value 550 or another performance characteristic of SCR catalytic converter 10, the dynamic correction characteristics map 370 being appropriately calibrated beforehand. Deviation factor 590, described in connection with FIG. 2, may then be obtained, as a function of exhaust gas temperature value $T_{Cat,n}$ and exhaust gas setpoint temperature value 305, from an appropriate characteristics map which is also calibrated beforehand. Instead of exhaust gas temperature value $T_{Cat,n}$, other performance characteristics of SCR catalytic converter 10 may be used here.

What is claimed is:

1. A method for operating a metering unit of a catalytic converter of a combustion system, the method comprising:
   metering a quantity of at least one reagent into an exhaust gas;
   determining a steady-state value of the reagent to be metered based on an assumed steady-state operating state of at least one of the catalytic converter and the combustion system; and
   adjusting the steady-state reagent value using at least one dynamic correction factor for a dynamic adjustment;
   wherein, as a function of at least one performance characteristic of the combustion system, steady-state values, including the steady-state value of the reagent to be metered, are each obtained from a steady-state characteristics map which was recorded during an assumed steady-state operating state of at least one of the catalytic converter and the combustion system.

2. The method according to claim 1, wherein the metering unit is of a SCR catalytic converter of an internal combustion engine of a motor vehicle.

3. The method according to claim 1, wherein the at least one reagent includes a reduction agent.

4. The method according to claim 1, wherein the dynamic correction factor is determined as a function of at least one performance characteristic of the catalytic converter and of the at least one performance characteristic of the combustion system.

5. The method according to claim 1, wherein at least one of the following performance characteristics of the catalytic converter is used for the adjustment of the steady-state reagent value:
   a) a nitrogen oxide emission value upstream from the catalytic converter, and
   b) an exhaust gas temperature value downstream from the catalytic converter.

6. The method according to claim 1, wherein the dynamic correction factor is determined based on a steady-state value for an exhaust gas temperature downstream from the catalytic converter and on a difference between the steady-state exhaust gas temperature value downstream from the catalytic converter and an exhaust gas temperature value downstream from the catalytic converter.

7. The method according to claim 1, wherein the steady-state reagent value is adjusted using a nitrogen oxide correction factor.

8. The method according to claim 7, further comprising determining the nitrogen oxide correction factor by comparing a nitrogen oxide emission value with a corresponding steady-state value of a nitrogen oxide emission.

9. The method according to claim 1, wherein the adjusting of the steady-state reagent value comprises multiplying the steady-state reagent value by the at least one correction factor.

10. The method according to claim 1, wherein the steady-state reagent value is adjusted using at least one of the following variables:
    a) a value for an operation period of the catalytic converter,
    b) a value for an operation period of the combustion system,
    c) a value for an ambient temperature,
    d) a coolant temperature value of the combustion system, and
    e) a value for an air moisture.

11. The method according to claim 1, further comprising obtaining each of the at least one correction factor from a characteristics map.

12. A method for operating a metering unit of a catalytic converter of a combustion system, the method comprising:
    metering a quantity of at least one reagent into an exhaust gas;
    determining a steady-state value of the reagent to be metered based on an assumed steady-state operating state of at least one of the catalytic converter and the combustion system;
    determining a nitrogen oxide correction factor by comparing a nitrogen oxide emission value with a corresponding steady-state value of a nitrogen oxide emission; and
    adjusting the steady-state reagent value using at least one dynamic correction factor for a dynamic adjustment and the nitrogen oxide correction factor wherein the nitrogen oxide correction factor as a quotient is computed from the nitrogen oxide emission value divided by the steady-state nitrogen oxide value.

13. A method for operating a metering unit of a catalytic converter of a combustion system, the method comprising:
    metering a quantity of at least one reagent into an exhaust gas;
    determining a steady-state value of the reagent to be metered based on an assumed steady-state operating state of at least one of the catalytic converter and the combustion system;
    determining a nitrogen oxide correction factor by comparing a nitrogen oxide emission value with a corresponding steady-state value of a nitrogen oxide emission;
    adjusting the steady-state reagent value using at least one dynamic correction factor for a dynamic adjustment and the nitrogen oxide correction factor; and
    supplying at least one of the nitrogen oxide emission value and the steady-state nitrogen oxide value to at least one filter.

14. A method for operating a metering unit of a catalytic converter of a combustion system, the method comprising:
    metering a quantity of at least one reagent into an exhaust gas;
    determining a steady-state value of the reagent to be metered based on an assumed steady-state operating state of at least one of the catalytic converter and the combustion system;
    determining a nitrogen oxide emission value upstream from the catalytic converter from at least one of: a) a signal from a nitrogen oxide sensor, and b) a simulation from at least one of engine data, measured values, and characteristics maps via computation of at least one of differential equations and functionals; and adjusting the steady-state reagent value using at least one dynamic correction factor for a dynamic adjustment;

wherein at least one of the following performance characteristics of the catalytic converter is used for the adjustment of the steady-state reagent value:

a) the nitrogen oxide emission value, and b) an exhaust gas temperature value downstream from the catalytic converter.

15. A method for operating a metering unit of a catalytic converter of an internal combustion engine of a motor vehicle, the method comprising:

metering a quantity of at least one reagent into an exhaust gas;

determining at least one of a value for an engine speed and a value for an injected fuel quantity as at least one performance characteristic of the internal combustion engine;

determining a steady-state value of the reagent to be metered based on an assumed steady-state operating state of at least one of the catalytic converter and the combustion system; and adjusting the steady-state reagent value using at least one dynamic correction factor for a dynamic adjustment wherein the metering unit is of a SCR catalytic converter of an internal combustion engine of a motor vehicle.

* * * * *